United States Patent
Lalik et al.

(10) Patent No.: US 7,123,189 B2
(45) Date of Patent: Oct. 17, 2006

(54) APPARATUS AND METHOD FOR ALLOWING USER TO TRACK PATH OF TRAVEL OVER EXTENDED PERIOD OF TIME

(75) Inventors: Christopher Lalik, Overland Park, KS (US); Bill Cross, Overland Park, KS (US); Richard Ball, Overland Park, KS (US)

(73) Assignee: Bushnell Performance Optics, Overland Park, KS (US)

( * ) Notice: Subject to any disclaimer, the term of this patent is extended or adjusted under 35 U.S.C. 154(b) by 302 days.

(21) Appl. No.: 10/881,459

(22) Filed: Jun. 30, 2004

(65) Prior Publication Data

US 2005/0253753 A1    Nov. 17, 2005

Related U.S. Application Data

(63) Continuation-in-part of application No. 10/845,394, filed on May 13, 2004.

(51) Int. Cl.
*G01S 5/14* (2006.01)

(52) U.S. Cl. .................. 342/357.13; 701/201; 701/206; 701/210

(58) Field of Classification Search ........... 342/357.06, 342/357.07, 357.13; 701/201, 206, 208–210, 701/213
See application file for complete search history.

(56) References Cited

U.S. PATENT DOCUMENTS

| | | | |
|---|---|---|---|
| 5,543,802 A * | 8/1996 | Villevieille et al. ......... | 701/206 |
| 5,592,173 A * | 1/1997 | Lau et al. ............... | 342/357.12 |
| 6,072,396 A | 6/2000 | Gaukel | |
| 6,356,841 B1 | 3/2002 | Hamrick et al. | |
| 6,377,210 B1 | 4/2002 | Moore | |
| 6,437,696 B1 | 8/2002 | Lemelson et al. | |
| 6,448,927 B1 * | 9/2002 | Ishigaki et al. ........ | 342/357.06 |
| 6,515,595 B1 | 2/2003 | Obradovich et al. | |
| 6,611,755 B1 | 8/2003 | Coffee et al. | |
| 6,639,550 B1 | 10/2003 | Knockeart et al. | |
| 6,650,975 B1 | 11/2003 | Ruffner | |
| 6,658,349 B1 | 12/2003 | Cline | |
| 2001/0005809 A1 * | 6/2001 | Ito ............................. | 701/210 |
| 2003/0004636 A1 * | 1/2003 | Adachi ...................... | 701/201 |
| 2003/0020638 A1 * | 1/2003 | Sari et al. .................. | 340/995 |
| 2005/0131628 A1 * | 6/2005 | Peeters ....................... | 701/209 |

* cited by examiner

*Primary Examiner*—Thomas H. Tarcza
*Assistant Examiner*—F H Mull
(74) *Attorney, Agent, or Firm*—Spencer Fane Britt & Browne LLP

(57) ABSTRACT

An apparatus (10) and method for allowing a moving user to automatically determine and store locations (11) over an extended period of time, to display the series of such locations (11), and to actively assist in returning to an earlier location. The apparatus (10) includes an antenna (16) for facilitating satellite lock, a fastening mechanism (18) for positioning the antenna (10) for best reception, and a satellite lock indicator (20) for communicating loss of satellite lock. The apparatus (10) also includes a timer (26) for measuring an interval during which the apparatus (10) is in a power-conserving sleep mode, and after which the user's current location is automatically determined. Active assistance in returning to an earlier location, either by traveling back along the path earlier traveled or by traveling along a more direct route, is accomplished by warning the user whenever the user's course deviates from the path or route.

4 Claims, 3 Drawing Sheets

APPARATUS AND METHOD FOR ALLOWING USER TO TRACK PATH OF TRAVEL OVER EXTENDED PERIOD OF TIME

RELATED APPLICATIONS

The present U.S. non-provisional patent application is a continuation-in-part of earlier-filed U.S. non-provisional patent application titled "Apparatus and Method for Allowing User to Track Path of Travel Over Extended Period of Time"; Ser. No. 10/845,394, filed May 13, 2004. As such, the present application claims, with regard to all common subject matter, priority benefit of the identified earlier-filed application, and hereby incorporates by reference the earlier-filed application in its entirety.

BACKGROUND OF THE INVENTION

1. Field of the Invention

The present invention relates broadly to apparatuses and methods for allowing a moving user to track his or her own movement over time and for actively assisting the user in returning to an earlier location. More particularly, the present invention concerns an apparatus and method for allowing the moving user to automatically periodically determine and store his or her own current geographic locations over an extended period of time, and to display the series of such locations as an indication of the user's path of travel. Additionally, the present invention is adapted and operable to actively assist the user in returning to an earlier location, either by traveling back along the path earlier traveled or by traveling along a more direct route.

2. Description of the Prior Art

It is often desirable for a user to be able to determine his or her own current geographic location, such as, for example, when hiking, climbing, running, or otherwise traveling through unknown or unfamiliar areas. This is accomplished in prior art devices using global positioning system (GPS) technology, wherein signals are received from a plurality of orbiting satellites and, based thereon, location is determined with respect to the satellites. Such GPS-based location-determining functionality is available in hand-held prior art devices that can be carried by the user on his or her person.

It is also desirable, however, for the user to be able to view his or her previous locations so as to better understand his or her path of travel over time. It will be appreciated that such information is particularly useful when the user desires or needs to backtrack or otherwise return along this path of travel. It will also be appreciated that under some circumstances, such as, for example, when traveling through rapidly changing terrain, locations must be determined and stored relatively frequently in order to provide the most complete and useful record. Furthermore, in order to accommodate extended travel, the process must allow for determining and storing locations in this manner for as long a period as possible. Prior art devices exist for determining and storing locations but, unfortunately, suffer from a number of drawbacks and disadvantages.

Hand-held prior art devices exist, for example, that allow the user to determine his or her current location and, if desired, designate the location as a "waypoint". The waypoint is then stored in memory and is available for later recall. Unfortunately, the designation of waypoints requires active participation by the user. Furthermore, the maximum number of waypoints that can be designated is likely to be extremely limited because the waypoint concept generally refers to a very limited number of special locations designated for very particular purposes, not an unlimited number of non-special locations designated merely for general record-keeping purposes. It will be appreciated that a user, relying on waypoints to provide a record of his or her previous locations may allow undesirably long periods of time to pass between designations. When the user does remember to make a designation, he or she may remove the electronic device from its protective or carrying environment only to find it impossible to quickly achieve the satellite lock necessary to determine the current location, and so the user must travel still further until the required lock can be established. Also, in order to designate waypoints, the device must either be left on continuously, thereby draining power and severely limiting both the amount of time in which new waypoints may be designated and the amount of time in which stored waypoints may be recalled, or the device must be turned on and off each time a designation is made. Turning the device on and off in this manner can itself result in a substantial power drain, and so the frequency with which waypoints are designated must be reduced. Thus, these particular prior art devices do not provide a practical and reliable mechanism for creating a record of the user's previous locations in such a manner as to allow for better understanding his or her path of travel.

More capable hand-held prior art devices exist that allow for creating a more complete and reliable record of previous locations automatically and without the drawbacks associated with using waypoint technology for this purpose. Unfortunately, these prior art devices quickly deplete their battery power, and once the power fails, no further locations are determined and the user can no longer display the record of previous locations. If the user travels for longer than a few hours with no ability to charge the battery, he or she will not be able to display the path of travel if the need arises to backtrack, creating a potentially dangerous situation.

Large-scale prior art systems also exist that allow for remotely tracking the locations of multiple vehicles over time. Such systems typically comprise a plurality of location-determining mechanisms, each being affixed to or otherwise associated with one of the remote and moving vehicles, and a central receiving and processing station for receiving location data from the location-determining mechanisms and for plotting such location data over time. Unfortunately, because the location-determining mechanisms are carried on vehicles, there are none of the weight, size, or power consumption restrictions that a hand-held device would require. Thus, internal processors have ample power and antennas are both large and fixed. Furthermore, while providing the location data to the central station for plotting does provide a record of travel over time to those at the central station, returning this information to the vehicle would require an additional receiver, memory, and display at the location-determining mechanism, and an additional transmitter at the central station. It will therefore be appreciated that these prior art systems are neither useful nor feasibly adaptable for solving the present problem of allowing hikers and other traveling individuals to save and recall their previous locations so as to better understand their path of travel.

Due to the above-identified and other problems and disadvantages in the art, a need exists for an improved apparatus or method for allowing a moving user to track his or her own movement over time and to assist the user in returning to an earlier location.

SUMMARY OF THE INVENTION

The present invention overcomes the above-described and other problems and disadvantages in the prior art by providing an apparatus and method for allowing a moving user to automatically periodically determine and store his or her own current geographic locations over an extended period of time, to display the series of such locations as an indication of the user's path of travel, and to actively assist the user in returning to an earlier location, either by traveling back along the path earlier traveled or by traveling along a more direct route.

In a preferred embodiment, the apparatus broadly comprises a housing; a GPS receiver; an antenna, including a fastening mechanism and a satellite lock indicator; a processor; a battery; a timer; a memory; a display; and an input mechanism. In normal operating mode, the apparatus functions in a substantially conventional manner to determine and display the user's current geographic location when desired. In a forward tracking mode, however, the apparatus takes steps to conserve power while automatically periodically determining and storing such locations.

The housing substantially encloses and protectively houses the sensitive components of the apparatus, protecting them from water, moisture, dust, and other environmental hazards. The GPS receiver functions, in a substantially conventional manner, to lock onto and receive signals from a plurality of orbiting satellites and, based thereon, to determine the current geographic location of the apparatus and the user with respect to the satellites. The antenna is connected to the GPS receiver and facilitates reception of the satellite signals used by the GPS receiver to determine location. The fastening mechanism is connected to the antenna and allows for removably coupling the antenna with an item worn or carried by the user. This feature allows for positioning the antenna for best reception of the satellite signals and, if the lock indicator is incorporated into the fastening mechanism, for locating the lock indicator for best visibility or audibility by the user. The satellite lock indicator functions, when the apparatus is in tracking mode, to communicate to the user that either the satellite lock necessary for the GPS receiver to determine the user's current location has not been achieved or that the ability of the battery to provide power is critically low. It will be appreciated that this feature is especially important and advantageous as the user might, without such a warning, travel for a substantial time or distance with no corresponding locations stored in the memory.

The processor controls, in a substantially conventional manner, internal electronic operation of the apparatus and coordinates functioning of the various other components, as appropriate, in both normal and tracking modes. The battery provides power to the various other components of the apparatus that require power in order to operate. It will be appreciated that the ability or capacity of the battery to provide such power is limited, and therefore it is an important feature of the present invention to make the most efficient use of this ability or capacity in order to extend and maximize the usefulness of the apparatus, particularly its ability to continue tracking the user's movement over time.

The timer measures, in tracking mode, a preestablished time interval during which the apparatus is in a "sleep" or minimum power consumption mode. At the end of the interval, the GPS receiver automatically determines the user's current location, which is then stored in the memory. Once the current location is determined and stored, the apparatus automatically re-enters the sleep mode and the timer-measured interval begins again. This process automatically repeats so long as the apparatus is in tracking mode. The memory receives, stores, and provides for recalling the series of locations determined by the GPS receiver. It will be appreciated that this series of locations, when displayed simultaneously, corresponds to or reflects the user's path of travel over time. The display displays the current location, as determined by the GPS receiver; the series of locations stored in the memory; and any other desired information. When the apparatus is in tracking mode, the display is automatically turned off in order to conserve power and thereby extend or maximize the usefulness of the apparatus. The input mechanism allows the user to provide input to the processor and other components.

As mentioned, the apparatus also includes a return tracking mode to actively assist the user in returning to an earlier location. Once the user identifies an earlier location from among the stored series of locations, and indicates whether he or she wishes to return to that location either by traveling back along the path earlier traveled or by traveling along a more direct route, the apparatus actively assists the user in doing so. This is accomplished by actively (e.g., visually or audibly) warning the user whenever his or her course deviates by a pre-established amount from the return path or route.

Thus, it will be appreciated that the apparatus of the present invention provides a number of substantial advantages over the prior art, including, for example, increased usefulness and safety resulting from being able to track automatically for at least 24 hours and preferably between 36 hours and 48 hours, which is substantially longer than is possible with similar prior art hand-held, battery-powered devices. Thus, the power conservation features of the present invention advantageously enable it to continue tracking long after prior art devices have depleted their power and ceased to operate.

Furthermore, the present invention automatically communicates to the user when a satellite lock cannot be established and, as a result, the current location cannot be determined. This is a particularly important feature given that the present invention is adapted to be stowed in a backpack or otherwise out of sight and function automatically. If this warning feature were not present, then the user might not know when the device fails to determine a current location and, as a result, the series of geographic location representing the user's route over time may again be dangerously incomplete.

Additionally, the return tracking mode or feature advantageously frees the user from having to refer continuously to the display by actively warning the user whenever his or her course deviates by a pre-established amount from the return path or route, thereby allowing the user to quickly adjust his or her course so as to more reliably and efficiently return to the earlier location.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

With reference to the figures, an apparatus 10 and method for allowing a moving user to automatically track his or her own movement over time is herein described, shown, and otherwise disclosed in accordance with a preferred embodiment of the present invention. More specifically, the apparatus 10, in a forward tracking mode or feature, allows the moving user to automatically periodically determine and store his or her own current geographic locations over an extended period of time and to display the series of such locations 11 as an indication of the user's path of travel, and, in a return tracking mode or feature, actively assists the user in returning to an earlier location, either by traveling back along the path earlier traveled or by traveling along a more direct route. The apparatus 10 accomplishes these functions with features for conserving power and communicating loss of the satellite lock. Because the apparatus 10 is meant to be hand-held and carried by hikers, climbers, sportsmen, athletes, and the like, it will be appreciated that it is limited to an appropriate and practical maximum size and weight.

Figure 1:
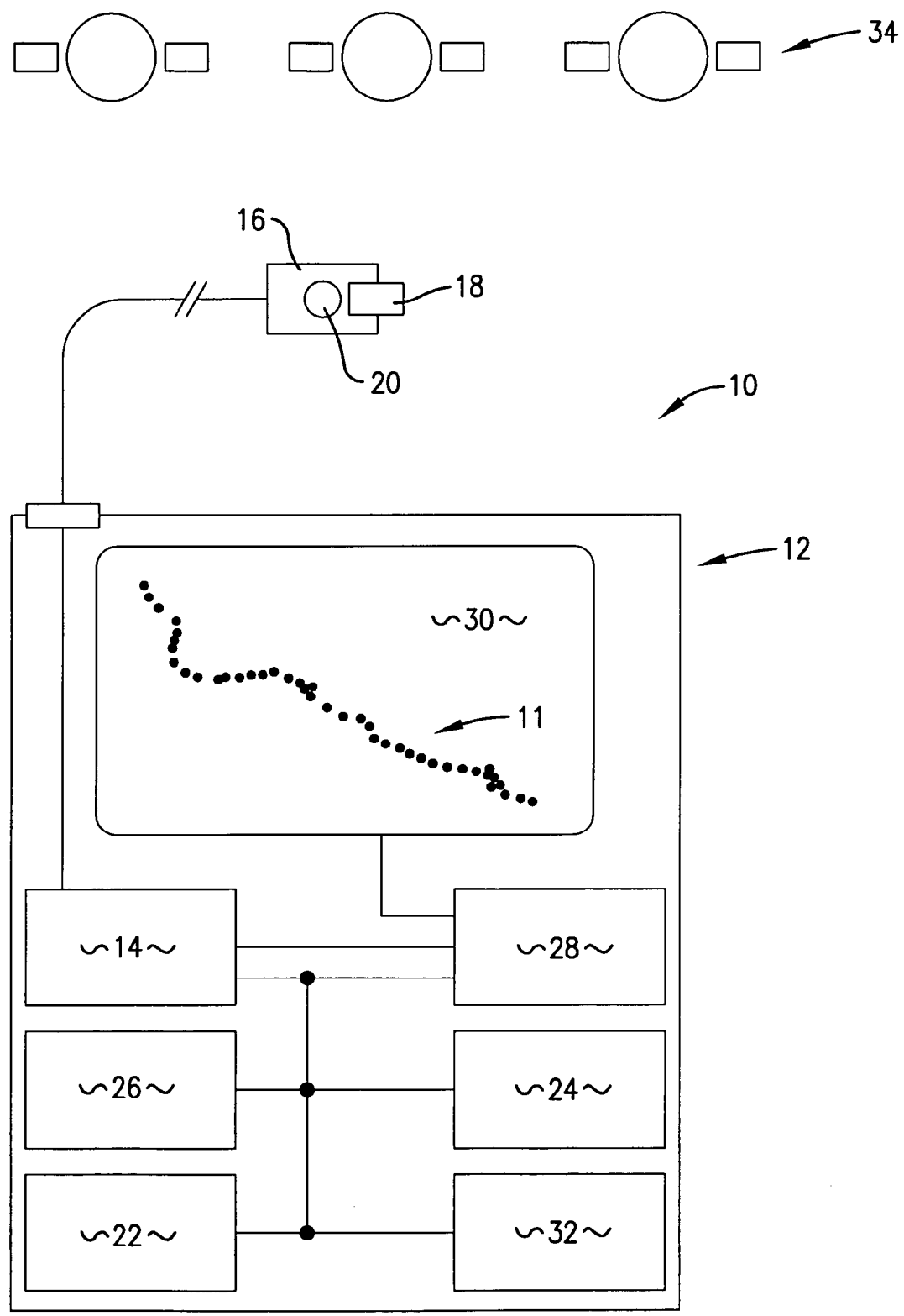
FIG. 1 is a block diagram of a preferred embodiment of the apparatus of the present invention.

In a preferred embodiment, referring particularly to FIG. 1, the apparatus 10 broadly comprises a housing 12; a GPS receiver 14; an antenna 16 including a fastening mechanism 18 and a satellite lock indicator 20; a processor 22; a battery 24; a timer 26; a memory 28; a display 30; and an input mechanism 32. In normal operating mode, the apparatus 10 functions in a substantially conventional manner to determine and display the user's current geographic location when desired. In tracking mode, however, the apparatus 10 takes steps to conserve power while automatically periodically determining and storing such locations.

The housing 12 substantially encloses and protectively houses the GPS receiver 14, processor 22, battery 24, timer 26, memory 28, display 30, and any other similarly sensitive components of the apparatus 10. The housing 12 is preferably a two-piece clamshell design constructed of lightweight, high-impact plastic, or another similarly suitable material, which, when assembled, is substantially sealed (using, e.g., gaskets seals, or other appropriate sealing mechanisms) against water, moisture, dust, and other environmental hazards that might otherwise adversely affect the sensitive components. It will be appreciated that, due to the hand-carried nature of the apparatus 10, the design and construction of the housing 12, as well as substantially all other components of the apparatus 10, is limited with respect to the aforementioned maximum allowable size and weight.

The GPS receiver 14 functions, in a substantially conventional manner, to lock onto and receive signals from a plurality of orbiting satellites 34 and, based thereon, to determine the current geographic location of the apparatus 10 and the user with respect to the satellites 34. This location may be formatted by the GPS receiver 14 in terms of longitudinal and latitudinal coordinates or any other appropriate coordinate system.

The antenna 16 is connected to the GPS receiver 14 and facilitates reception of the satellite signals used by the GPS receiver 14 to determine location. The antenna 16 may be an active antenna, a wireline antenna, an extendable antenna, a wireless remote antenna, or other type of suitable antenna design. The fastening mechanism 18 is connected to the antenna 16 and allows for removably coupling the antenna 16 with a backpack, article of clothing, or other item worn or carried by the user. This feature allows for positioning the antenna 16 for best reception of the satellite signals and, if the lock indicator 20 is incorporated into the fastening mechanism 18, for locating the lock indicator 20 for best visibility or audibility by the user. The fastening mechanism 18 may include, for example, a clasp, clip, hook, hook-and-loop material, or other suitable coupling structure or material.

The satellite lock indicator 20 functions, when the apparatus 10 is in tracking mode, to visually, audibly, vibratorily, or otherwise communicate to the user that either the satellite lock necessary for the GPS receiver 14 to determine the user's current location has not been achieved or that the ability of the battery 24 to provide power is critically low. The lock indicator 20 may be used to show both good and bad states, wherein, for example, a slow pulsing or other scheme might be used to indicate a good satellite lock and sufficient battery power, a rapid pulsing might be used to indicate a loss of satellite lock, and no pulsing might be used to indicate low battery power. Preferably, when the satellite lock is lost, the apparatus 10 initiates a re-start routine that makes a preset number (e.g., two to five) of attempts to re-establish the lost satellite lock before communicating the loss to the user via the lock indicator 20. This preset number may be set by the user. As mentioned, the lock indicator 20 may be incorporated into the fastening mechanism 18, as shown in FIG. 1, so as to be better visible or audible when the housed portion of the apparatus 10 is stowed in a backpack or otherwise out of the user's immediate sight or hearing. Where the lock indicator 20 is visual in nature (e.g., one or more LEDs), a particular color (e.g., red) or blink rate (e.g., continuous or periodic) may be used to communicate the aforementioned conditions. Similarly, where the lock indicator 20 is audible in nature, a particular continuous or periodic tone may be used. It will be appreciated that this feature is especially important and advantageous as the user might, without such a warning, travel for a substantial time or distance with no corresponding locations stored in the memory 28. The warning communicated by the lock indicator 20 may be turned off by the user when desired.

Thus, the apparatus 10 can be packed or otherwise stored in any convenient place, and the antenna 16 positioned using the fastening mechanism 18 to best receive the satellite signals necessary for the GPS receiver 14 to determine location. Unlike the prior art, the apparatus 10 operates automatically when in tracking mode and therefore need not be kept where it can be frequently accessed for manual operation.

The processor 22 controls, in a substantially conventional manner, internal electronic operation of the apparatus 10 and coordinates functioning of the various other components, as appropriate, in both normal and tracking modes.

The battery 24 provides power to the various other components of the apparatus 10 that require power in order to operate. It will be appreciated that the ability or capacity of the battery 24 to provide such power is limited, and therefore it is an important feature of the present invention to make the most efficient use of this ability or capacity in order to extend and maximize the usefulness of the apparatus 10, particularly its ability to continue tracking the user's movement over time.

The timer 26 measures, in tracking mode, a preestablished time interval of at least 10 seconds and preferably between 10 seconds and 60 seconds or between 10 seconds and 5 minutes or longer. During this interval, the apparatus 10 is in a "sleep" or minimum power consumption mode. At the end of the interval, the GPS receiver 14 automatically determines the user's current location, which is then stored in the memory 28. Once the current location is determined and stored, the apparatus 10 automatically re-enters the sleep mode and the timer-measured interval begins again. This process automatically repeats so long as the apparatus 10 is in tracking mode. The time interval may be preestablished by the user. It will be appreciated that the length of the preestablished time interval will depend to a great extent on balancing battery life with user needs, and with consideration of such factors as, for example, the desired tracking accuracy, the nature of the terrain, and the speed with which the user is traveling.

The memory 28 receives, stores, and provides for recalling the series of locations 11 determined by the GPS receiver 14. It will be appreciated that this series of locations 11, when displayed simultaneously, corresponds to or reflects the user's path of travel over time. If the apparatus 10 is shut-down or loses satellite lock, the stored locations are maintained in flash memory.

The display 30 displays or otherwise communicates the current location, as determined by the GPS receiver 14; the series of locations 11 stored in the memory 28; and other desired information. When the apparatus 10 is in tracking mode, the display 30 is automatically turned off in order to conserve power and thereby extend or maximize the usefulness of the apparatus 10. The display 30 can be turned back on very quickly when desired, but, so long as tracking mode is engaged, the display 30 will automatically turn off again after a preset period, such as, for example, 30 seconds or between approximately 20 second and 60 seconds, in order to conserve power. The user can, as desired, navigate along the displayed series of locations 11 between the initial location and the last location.

The input mechanism 32 allows the user to provide input to the processor 22 and other components, and is particularly important to the return tracking mode or feature described below.

Figure 2:
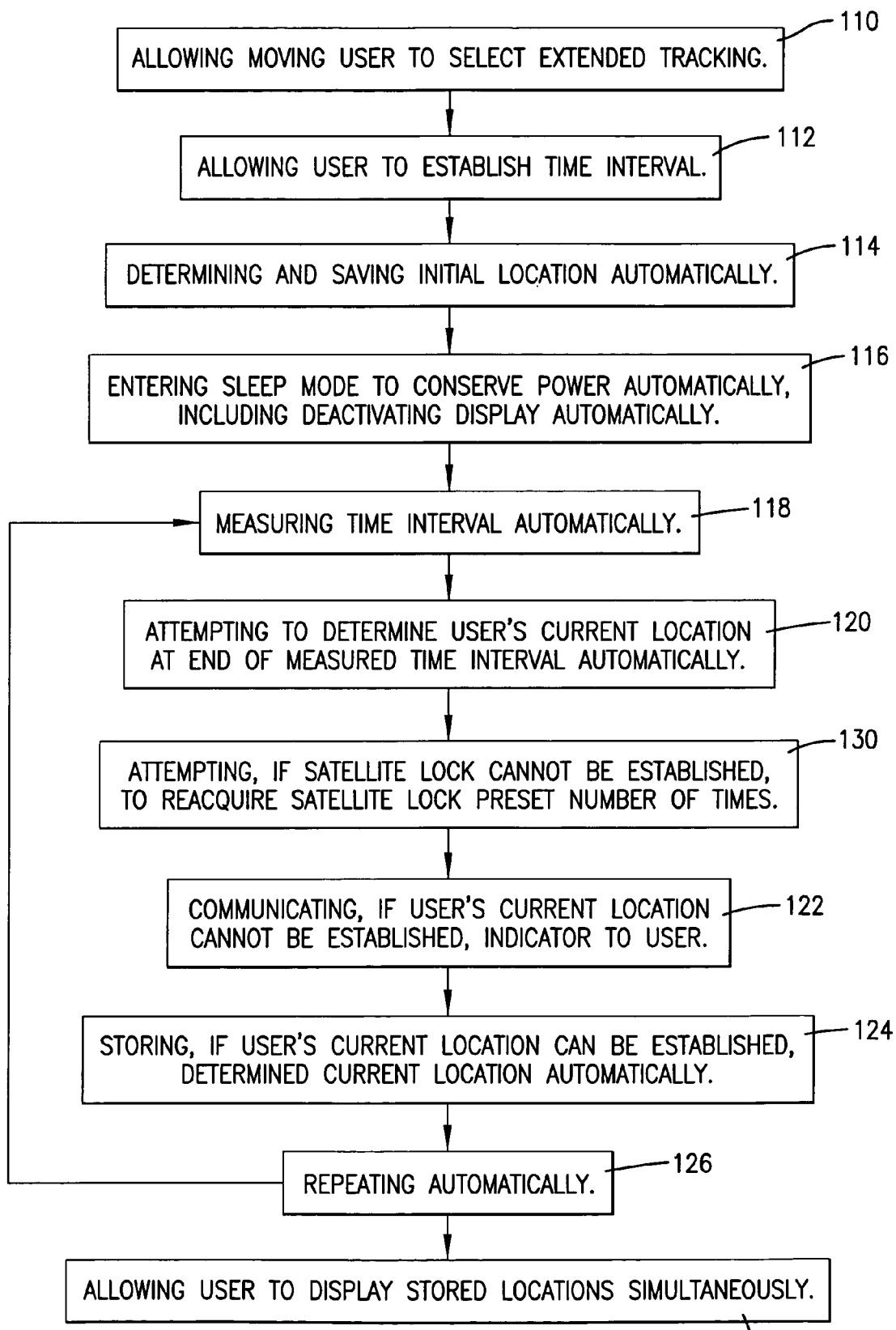
FIG. 2 is a flowchart of steps involved in a preferred embodiment of a forward tracking mode or feature of the method of the present invention, as may be implemented by the apparatus of FIG. 1.

Referring also to FIG. 2, it will be appreciated that the present invention may alternatively be characterized as a method, wherein the above-described apparatus 10 is an exemplary instance of how the functionality of the method might be implemented in hardware, software, firmware, or any appropriate combination thereof. Broadly, the method, in its forward tracking mode or feature, comprises the steps of, with a hand-held apparatus, (a) allowing the moving user to select an operation mode involving extended tracking, as depicted in box 110; (b) allowing the user to select or otherwise establish a time interval between location determinations, as depicted in box 112; (c) determining the user's initial location automatically and saving the determined initial location in a memory automatically, as depicted in box 114; (d) entering a sleep mode to conserve power automatically, including deactivating a display automatically, as depicted in box 116; (e) measuring the preestablished time interval automatically, as depicted in box 118; (f) exiting the sleep mode and attempting to determine the user's current location at the end of the measured time interval automatically, as depicted in box 120; (g) communicating, if the user's current location cannot be established, an indicator to the user that the attempt to determine the user's current location failed, as depicted in box 122; (h) storing, if the user's current location can be established, the determined current location in the memory automatically, as depicted in box 124; (i) repeating steps (d) through (h) automatically until such time as the user deselects the extended tracking mode or power is depleted, as depicted in box 126; and (j) allowing the user to display the stored initial and current locations simultaneously, as depicted in box 128, wherein the series of stored initial and current locations 11 provide an indication of the user's path of travel over time.

Prior to communicating, in step (g), the loss of the satellite lock, the apparatus 10 may attempt to reacquire the satellite lock a preset number of times, as depicted in box 130. Only if these re-acquisition attempts are unsuccessful will the problem be communicated.

As mentioned, the apparatus 10 also includes a return tracking mode or feature to actively assist the user in returning to an earlier location, either by traveling back along the path earlier traveled (as represented by the stored series of locations) or by traveling along a more direct route. It will be appreciated that the situations in which such return may be desirable are many and varied: the user may, for example, wish to return to the earlier location in order to investigate some earlier-identified object or place of interest or to return to a branching point in the path, or the user may wish to backtrack along the path earlier traveled in order to search for an item that may have been dropped or otherwise inadvertently left behind; or the user may wish to return along the same path rather than another route simply because the path earlier traveled has already been determined to be safe for travel; or, under other circumstances, particularly where speed is desired, the user may wish to return to an earlier point on the path by the most direct route possible.

Figure 3:
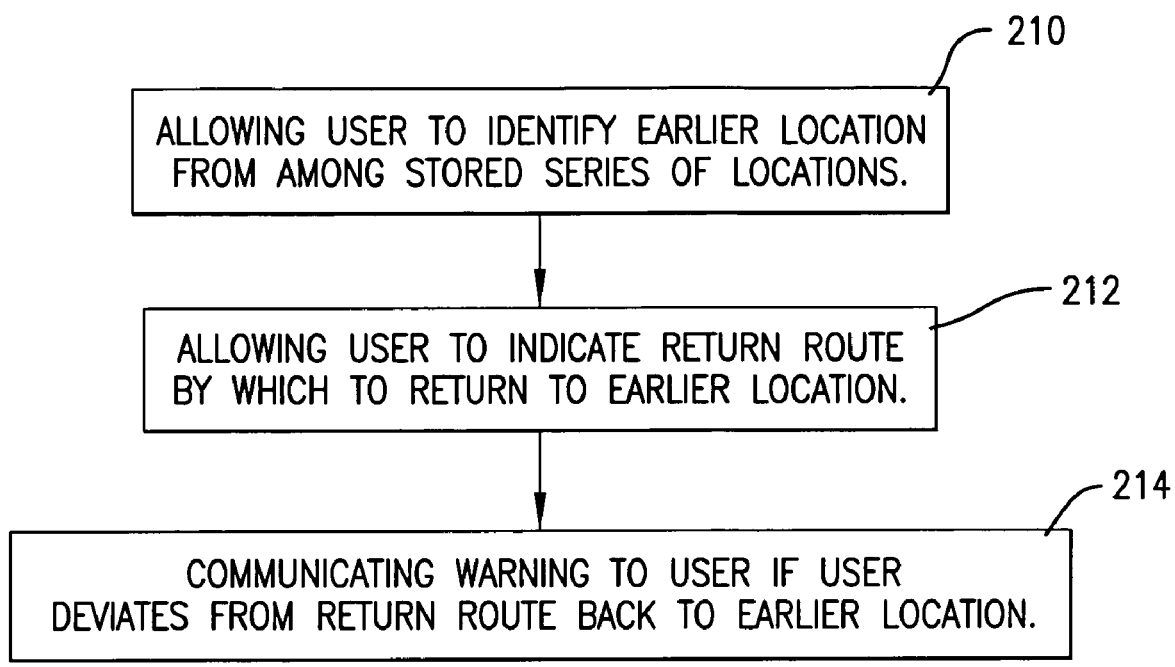
FIG. 3 is a flowchart of steps involved in a preferred embodiment of a return tracking mode or feature of the method of the present invention, as may be implemented by the apparatus of FIG. 1.

Referring also to FIG. 3, the return tracking mode or feature of the present invention may be characterized as a method similar to the above-described forward tracking mode or feature. Broadly, the method comprises the steps of (a) allowing the user to identify the earlier location, from among the stored series of locations 11, to which he or she desires to return, as depicted in box 210; (b) allowing the user to select a return route by which to return to the earlier location, as depicted in box 212; and (c) communicating a warning to the user if the user deviates from the return route back to the earlier geographic location. Steps (a) and (b) may be accomplished using the input mechanism 32 to identify the earlier location and select the return route.

As mentioned, the return route may involve traveling back along the path earlier traveled. In effect, the user would travel back to each location in the stored series of locations between the user's current location and the earlier location destination. Alternatively, the return route may be the shortest practical or possible route from the user's current location to the earlier location, which may or may not include traveling to any of the intermediate locations.

The lock indicator 20 may be adapted to function also as a warning mechanism for communicating the warning to the user, or a separate warning mechanism may be provided in the apparatus 10. As such, the warning mechanism 20 may be visual, audible, or vibratory in nature or otherwise suitable to communicate to the user that he or she has deviated from the return route. The warning mechanism 20 may be made to communicate its warning when the user deviates from the return route by more than a pre-established amount. Preferably, the pre-established deviation amount defaults to a crosstrack error value based on an appropriate percentage, such as, for example, approximately between 5%–15%, of the total distance to be traveled or total distance remaining to be traveled to the desired earlier location destination, or the total distance to the next previously-determined location or total distance remaining to be traveled to the next previously-determined location along the return route to the desired earlier location destination. Optionally, the pre-established deviation amount could be set by the user in light of traveling conditions (e.g, light levels, obstacles). Though the pre-established deviation amount could, alternatively, be based on a difference between heading and bearing, the warning mechanism 20 would likely activate too frequently as the user adjusts his or her course to avoid trees and other obstacles. Preferably, the user can deactivate the warning mechanism 20 when desired.

From the preceding discussion it will be appreciated that the apparatus of the present invention provides a number of substantial advantages over the prior art, including, for example, increased usefulness and safety resulting from being able to track automatically for at least 24 hours and preferably between 36 hours and 48 hours, which is substantially longer than is possible with similar prior art battery-powered devices. More specifically, the power conservation features of the present invention advantageously enable it to continue tracking long after hand-held, battery-powered prior art devices have depleted their power and ceased to operate.

Furthermore, the present invention automatically communicates to the user when a satellite lock cannot be established and, as a result, the current location cannot be determined. This is a particularly important feature given that the present invention is adapted to be stowed in a backpack or otherwise out of sight and function automatically. If this warning feature were not present, then the user might not know when the device fails to determine a current location such that the series of locations representing the user's route over time may again be dangerously incomplete.

Additionally, the return tracking mode or feature advantageously frees the user from having to refer continuously to the display by actively warning the user whenever his or her course deviates by a pre-established amount from the return path or route, thereby allowing the user to quickly adjust his or her course so as to more reliably and efficiently return to the earlier location.

Although the invention has been described with reference to the preferred embodiments illustrated in the attached drawings, it is noted that equivalents may be employed and substitutions made herein without departing from the scope of the invention as recited in the claims. It will be appreciated, for example, that the apparatus may be provided with additionally complementary functionality, as desired. Similarly, the method may be implemented in any combination of hardware, software, or firmware, which need not take the form of the particular embodiment of the apparatus disclosed herein.

Having thus described the preferred embodiment of the invention, what is claimed as new and desired to be protected by Letters Patent includes the following:

The invention claimed is:

1. An apparatus for actively assisting a user in returning to an earlier geographic location, the apparatus comprising:
    a GPS receiver for receiving signals from a plurality of orbiting satellites and, based thereon, determining a geographic location of the apparatus with respect to the orbiting satellites;
    a memory for storing a series of the geographic locations, including a current geographic location, corresponding to a movement of the apparatus over time;
    an input mechanism for allowing the user to identify, from among the stored series of geographic locations, the earlier geographic location to which the user desires to return, and for allowing the user to select a return route by which to return to the earlier geographic location; and
    a warning mechanism for communicating a warning to the user when the user deviates from the return route by more than a pre-established amount while traveling back to the earlier geographic location, wherein the pre-established amount is based on a total distance to be traveled between the current geographic location and the earlier geographic location.

2. An apparatus for actively assisting a user in returning to an earlier geographic location, the apparatus comprising:
    a GPS receiver for receiving signals from a plurality of orbiting satellites and, based thereon, determining a geographic location of the apparatus with respect to the orbiting satellites;
    a memory for storing a series of the geographic locations, including a current geographic location, corresponding to a movement of the apparatus over time;
    an input mechanism for allowing the user to identify, from among the stored series of geographic locations, the earlier geographic location to which the user desires to return, and for allowing the user to select a return route by which to return to the earlier geographic location; and
    a warning mechanism for communicating a warning to the user when the user deviates from the return route by more than a pre-established amount while traveling back to the earlier geographic location, wherein the pre-established amount is based on a total distance between the current geographic location and a next geographic location in at least a portion of the series of geographic locations included in the return route.

3. An apparatus for actively assisting a user in returning to an earlier geographic location, the apparatus comprising:
    a GPS receiver for receiving signals from a plurality of orbiting satellites and, based thereon, determining a current geographic location of the apparatus with respect to the orbiting satellites;
    a timer for measuring a preestablished time interval during which time the apparatus is in a power-conservation mode, and at the expiration of which the GPS receiver automatically determines the current geographic location of the apparatus, wherein the preestablished time interval is repeatedly measured and the current geographic location is repeatedly determined so as to result in a series of geographic locations corresponding to a movement of the apparatus over time;
    a memory for storing the series of geographic locations;
    an input mechanism for allowing the user to identify, from among the stored series of geographic locations, the earlier geographic location to which the user desires to return, and for allowing the user to select a return route by which to return to the earlier geographic location; and
    a warning mechanism for communicating a warning to the user when the user deviates from the return route while traveling back to the earlier geographic location, wherein the warning mechanism communicates the warning when the user deviates from the return route by more than a pre-established amount, and wherein the pre-established amount is based on a total distance to be traveled between the current geographic location and the earlier geographic location.

4. An apparatus for actively assisting a user in returning to an earlier geographic location, the apparatus comprising:
- a GPS receiver for receiving signals from a plurality of orbiting satellites and, based thereon, determining a current geographic location of the apparatus with respect to the orbiting satellites;
- a timer for measuring a preestablished time interval during which time the apparatus is in a power-conservation mode, and at the expiration of which the GPS receiver automatically determines the current geographic location of the apparatus, wherein the preestablished time interval is repeatedly measured and the current geographic location is repeatedly determined so as to result in a series of geographic locations corresponding to a movement of the apparatus over time;
- a memory for storing the series of geographic locations;
- an input mechanism for allowing the user to identify, from among the stored series of geographic locations, the earlier geographic location to which the user desires to return, and for allowing the user to select a return route by which to return to the earlier geographic location;
- a warning mechanism for communicating a warning to the user when the user deviates from the return route while traveling back to the earlier geographic location, wherein the warning mechanism communicates the warning when the user deviates from the return route by more than a pre-established amount, and wherein the pre-established amount is based on a total distance between the current geographic location and a next geographic location in the portion of the series of geographic locations included in the route.

* * * * *